(12) United States Patent
Masuda et al.

(10) Patent No.: US 9,194,747 B2
(45) Date of Patent: Nov. 24, 2015

(54) APPARATUS, SYSTEM, AND METHOD OF ESTIMATING SPECTRUM OF OBJECT

(71) Applicants: Kensuke Masuda, Kanagawa (JP); Go Maruyama, Kanagawa (JP); Yuji Yamanaka, Kanagawa (JP)

(72) Inventors: Kensuke Masuda, Kanagawa (JP); Go Maruyama, Kanagawa (JP); Yuji Yamanaka, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 78 days.

(21) Appl. No.: 14/083,979

(22) Filed: Nov. 19, 2013

(65) Prior Publication Data
US 2014/0152983 A1 Jun. 5, 2014

(30) Foreign Application Priority Data

Dec. 3, 2012 (JP) .................................. 2012-264303
Sep. 30, 2013 (JP) .................................. 2013-204695

(51) Int. Cl.
G01J 3/46 (2006.01)
G01J 3/51 (2006.01)

(52) U.S. Cl.
CPC ............... *G01J 3/513* (2013.01); *G01J 3/462* (2013.01); *G01J 3/51* (2013.01); *G01J 2003/467* (2013.01)

(58) Field of Classification Search
CPC .............. G06K 9/46; G06K 9/00; F21V 9/00; H04N 5/228
See application file for complete search history.

(56) References Cited

U.S. PATENT DOCUMENTS

2009/0202120 A1* 8/2009 Otsuka ........................ 382/128
2010/0085758 A1* 4/2010 Takahashi et al. ............ 362/293
2010/0328484 A1* 12/2010 Yamada ..................... 348/222.1

FOREIGN PATENT DOCUMENTS

| JP | 2001-099710 | 4/2001 |
|---|---|---|
| JP | 2004-289728 | 10/2004 |
| JP | 2004-336657 | 11/2004 |
| JP | 2004-340978 | 12/2004 |
| JP | 2012-141729 | 7/2012 |

* cited by examiner

Primary Examiner — Tarfur Chowdhury
Assistant Examiner — Jamil Ahmed
(74) Attorney, Agent, or Firm — Oblon, McClelland, Maier & Neustadt, L.L.P.

(57) ABSTRACT

An apparatus or system of estimating a spectrum of an object includes a plurality of filters or a plurality of filter areas that respectively have spectral characteristics different from one another, wherein at least two filters or filter areas have transmittance greater than a predetermined value throughout a wavelength range subject for estimation. The image capturing apparatus or system estimates a line spectrum of an object using spectral images of the at least two filters or filter areas having transmittance greater than the predetermined value.

12 Claims, 8 Drawing Sheets

FIG. 9

|   | CH1  | CH2  | CH3  | CH4  | CH5  | CH6  |
|---|------|------|------|------|------|------|
| a | 90   | 90   | 90   | 90   | 90   | 90   |
| b | 400  | 460  | 520  | 580  | 640  | 700  |
| c | 25.5 | 25.5 | 25.5 | 25.5 | 25.5 | 25.5 |

FIG. 10

| | |
|---|---|
| EQUATION 1 | $a\exp\left\{-\dfrac{(x-b)^2}{2c^2}\right\}$ |
| EQUATION 2 | $\bar{x}(\lambda), \bar{y}(\lambda), \bar{z}(\lambda)$ |
| EQUATION 3 | $X = k \int_{vis} \phi(\lambda) \cdot \bar{x}(\lambda) d\lambda$ <br> $Y = k \int_{vis} \phi(\lambda) \cdot \bar{y}(\lambda) d\lambda$ <br> $Z = k \int_{vis} \phi(\lambda) \cdot \bar{z}(\lambda) d\lambda$ |
| EQUATION 4 | $K = 100 / \int_{vis} \phi(\lambda) \cdot \bar{y}(\lambda) d\lambda$ |
| EQUATION 5 | $\begin{pmatrix} R \\ G \\ B \end{pmatrix} = \begin{pmatrix} 0.41844 & -0.15866 & -0.08283 \\ -0.09117 & 0.25242 & 0.01570 \\ 0.00092 & -0.00255 & 0.17858 \end{pmatrix} \begin{pmatrix} X \\ Y \\ Z \end{pmatrix}$ |

APPARATUS, SYSTEM, AND METHOD OF ESTIMATING SPECTRUM OF OBJECT

CROSS-REFERENCE TO RELATED APPLICATIONS

This patent application is based on and claims priority pursuant to 35 U.S.C. §119 to Japanese Patent Application Nos. 2012-264303, filed on Dec. 3, 2012, and 2013-204695, filed on Sep. 30, 2013, in the Japan Patent Office, the entire disclosure of which is hereby incorporated by reference herein.

BACKGROUND

1. Technical Field

The present invention generally relates to an apparatus, system, and a method of estimating a spectrum of an object.

2. Description of the Related Art

The color, state, or properties of an object may be obtained through evaluating spectral information of the object. While a continuous spectrum of the object may be estimated using the Weiner estimation method, estimating a line spectrum of the object has been difficult.

SUMMARY

Example embodiments of the present invention include an apparatus for estimating a spectrum of an object such as an image capturing apparatus, which includes an optical system that focuses lights from an object to generate optical information, at least two filters or filter areas having transmittance greater than a predetermined value throughout a wavelength range subject for estimation, a sensor that forms a plurality of types of spectral image based on the optical information, and a processor that estimates a line spectrum of the object using spectral images of the at least two filters or filter areas having transmittance greater than the predetermined value.

Example embodiments of the present invention include a system for estimating a spectrum of an object such as an image capturing system including an image capturing apparatus and an information processing apparatus. The image capturing system includes an optical system that focuses lights from an object to generate optical information, at least two filters or filter areas having transmittance greater than a predetermined value throughout a wavelength range subject for estimation, and a sensor that forms a plurality of types of spectral image based on the optical information. The information processing apparatus estimates a line spectrum of the object using spectral images of the at least two filters or filter areas having transmittance greater than the predetermined value.

Example embodiments of the present invention include a spectrum estimation method and a non-transitory recording medium storing a plurality of instructions which cause a processor to perform a spectrum estimation method. The method includes: obtaining a plurality of types of spectral image, the plurality of types of spectral image being generated by passing lights through filtering means having m items of filters or filter areas that respectively have spectral characteristics different from one another, wherein at least n items of filters or filter areas of the filtering means are configured to have transmittance greater than a predetermine value throughout a wavelength range subject for estimation; determining whether there is no output of spectral image for (m-n) items of spectral images; switching to a line spectrum mode when the determining determines that there is no output of spectral image for (m-n) items of spectral images; and estimating a line spectrum of the object using spectral images of the at least n items of filters or filter areas having transmittance greater than the predetermined value.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is a table illustrating parameters for each of filters of the image capturing device of FIG. 2; and FIG. 10 is a table illustrating various equations to be used by the image capturing device of FIG. 2.

Figure 1:
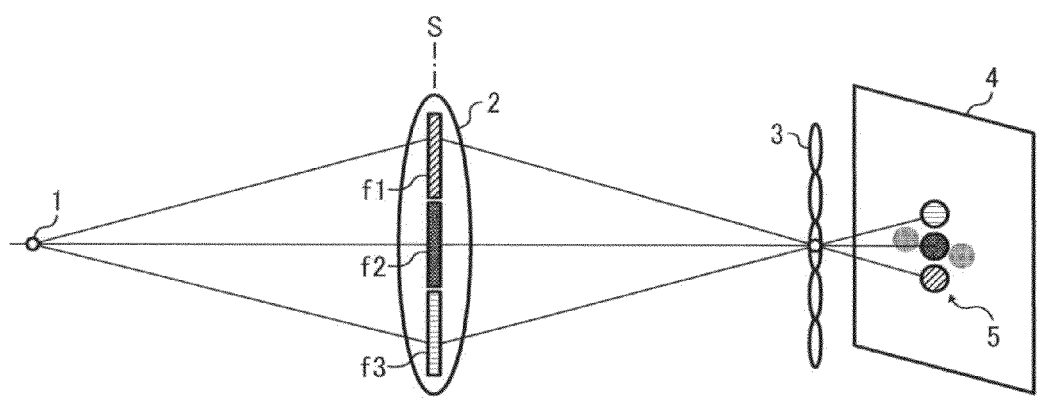
FIG. 1 is an illustration for explaining the theory of image capturing, using an image capturing device.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to FIG. 1, the theory of image capturing is explained using an optical system 2 as an example. In this example, the optical system 2 includes a single lens having a diaphragm position S along the center line. Along the center line of the single lens 2, three filters f1 (Red), f2 (Green), and f3 (Blue) are provided, which together function as a filter array. For simplicity, FIG. 1 illustrates the filters f1 to f3 as they are positioned inside the lens 2 in FIG. 1. It is to be noted that the actual positions of the filters are not within the lens, but near the lens.

Still referring to FIG. 1, a micro-lens array (MLA) 3 is provided near an image plane 4 at which lights from the main lens 2 are focused. The image plane 4 has a sensor 5, which is one example of imaging element. In this example, the sensor 5 may be implemented by a monochrome sensor. The MLA 3 is a lens array, in which a plurality of lenses are arranged substantially in parallel to a two-dimensional planar direction of the sensor 5.

The lights from an arbitrary point 1 of an object enters at the respective positions of the single lens 2, and pass through the filters f1 to f3 that respectively have different spectral characteristics according to their positions. The lights passing through the filters are focused at the MLA 3. The MLA 3 irradiates the lights at the respective positions of the sensor 5. The lights, diffused from the point 1 of the object, and respectively having different spectral characteristics, are irradiated at different positions on the sensor 5. The image formed on the sensor 5 thus have spectral information of a plurality of types for that point 1 of the object.

In a substantially similar manner, lights diffused from a point of the object, which is different than the arbitrary point 1 as described above, are irradiated onto different positions on the sensor 5 to form an image indicating spectral information of a plurality of types for that point of the object. Through image processing, the plurality of types of spectral information of the object 1, which are obtained as described above for more than one point of the object 1, is organized according to the spectral characteristics, thus simultaneously generating a two-dimensional image indicating different spectral characteristics.

Based on this principle, by providing a plurality of filters such as band-pass filters near the diaphragm position S of the single lens 2, the two-dimensional image indicating different spectral characteristics of the object can be instantly measured. In this example, the position near the diaphragm position S not only includes the diaphragm position S, but also the position through which lights pass at various angles of view.

In order to measure a spectrum of an object found in nature, a sufficient number of band-pass filters are required to capture the images of six or more bands. Accordingly, six or more band-bass filters having different spectral characteristics need to be arranged near the diaphragm position S of the single lens 2, to obtain spectral information of six or more types. While FIG. 1 shows only three filters, as described below referring to FIG. 3, an image capturing device in this example is assumed to have six filters.

In one example, a plurality of filters respectively having a plurality of types of spectral characteristics that are different from one another may be provided. More specifically, the plurality of filters may be combined.

In another example, a plurality of filter areas respectively having a plurality of spectral characteristics that are different from one another may be provided. The filter, or the unitarily formed filter, has a plurality of filter areas having different spectral characteristics.

Figure 2:
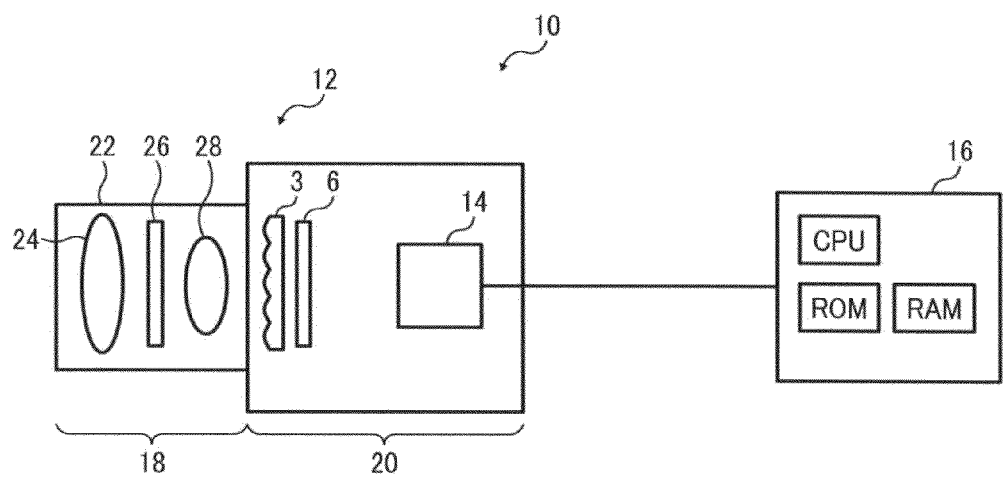
FIG. 2 is a schematic diagram illustrating a structure of an image capturing system provided with an image capturing device and a spectrum calculator, according to an example embodiment of the present invention.

FIG. 2 illustrates an image capturing system 10 according to an example embodiment of the present invention. The image capturing system 10 includes an image capturing device 12 that obtains spectral information from an object and generates a spectral image of a plurality of types based on the spectral information, and a spectrum calculator 16. In this example, the image capturing device 12 is implemented by a camera having the MLA as described above referring to FIG. 1, such as a plenoptic camera. The image capturing device 12 includes a field-programmable gate array (FPGA) 14, which generates a spectral image. More specifically, the FPGA 14 generates a plurality of types of spectral image based on the spectral information captured by the image capturing device 12.

The spectrum calculator 16 includes a central processing unit (CPU), a read only memory (ROM), and a random access memory (RAM). The spectrum calculator 16 calculates a spectrum of each pixel in the spectral image generated by the FPGA 14 to estimate a spectrum of the object. For example, the spectrum calculator 16 estimates a refection spectral image or an illumination spectral image of the object.

In one example, spectrum estimation program may be stored in a memory such as the ROM. The CPU loads the spectrum estimation program onto the RAM that functions as a work area for the CPU, to perform spectrum estimation. The spectrum estimation program may be downloaded from the outside apparatus via a network, or read out from a memory such as a removable medium. In such case, the spectrum calculator 16 is provided with an interface such as a network interface or an output device interface.

The image capturing device 12 mainly includes a lens module 18, and a camera 20 incorporating the FPGA 14 therein. Alternatively, the FPGA 14 may be provided outside the image capturing device 12. In such case, for example, the FPGA 14 and the spectrum calculator 16 may be incorporated into one device.

The lens module 18 includes a lens tube 22, a main lens 24 functioning as a first optical system within the lens tube 22, a filter 26 provided near the diaphragm position of the main lens, and a lens 28. The camera 20 includes a MLA 3 functioning as a second optical system, a color sensor 6 functioning as the imaging element, and the FPGA 14. In this example, a plurality of micro-lenses is arranged in a direction orthogonal to an optical axis of the main lens 24 to form the MLA 3.

On the color sensor 6, a micro-lens is provided for each pixel, such that a collection of the micro-lenses functions as a lens array at the sensor side. In this example, the color sensor 6 is implemented by a RGB color sensor having a Bayer layout in which color filters of red, green, and blue are provided for each pixel.

Figure 3:
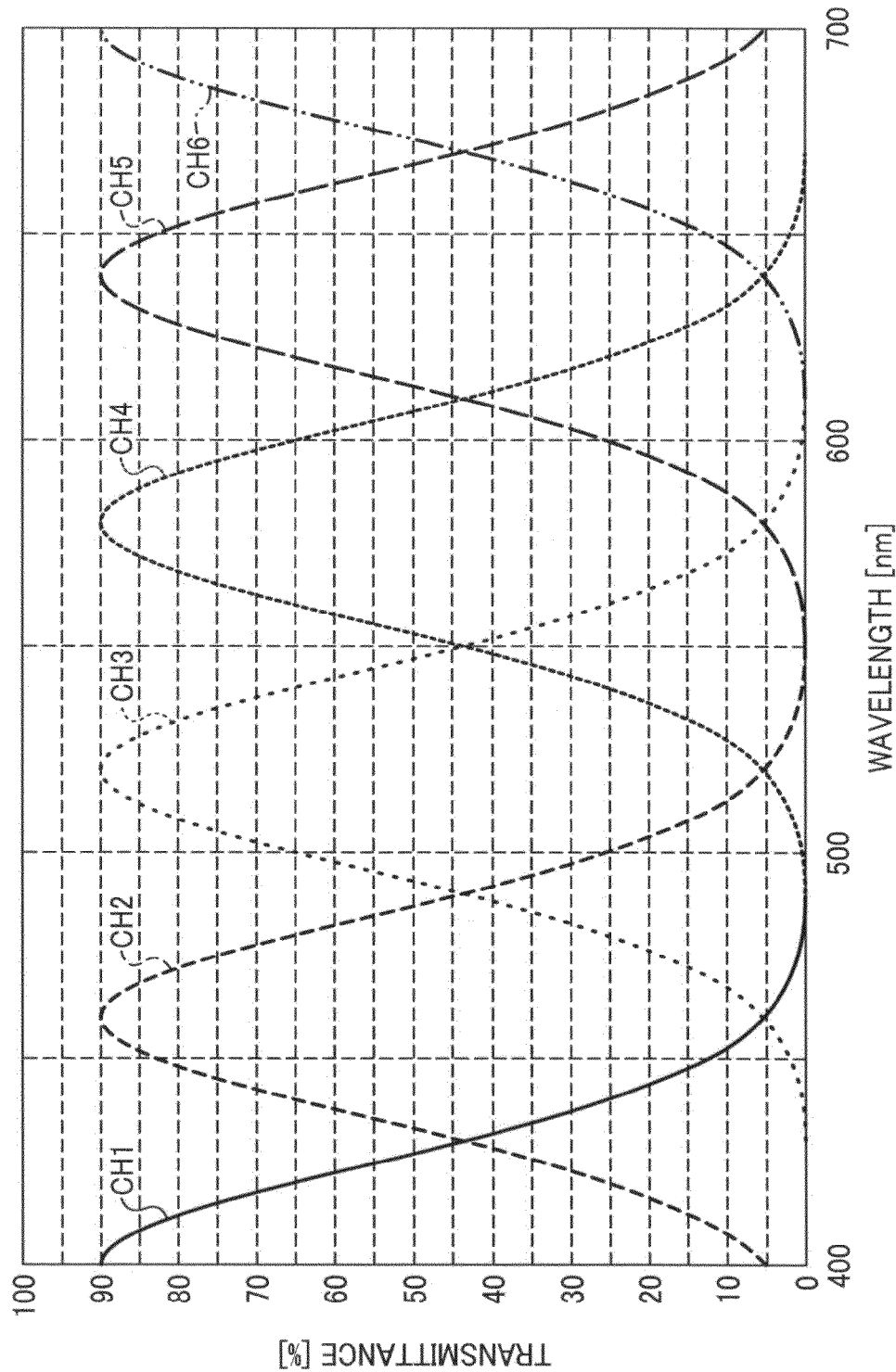
FIG. 3 is a graph illustrating properties of spectral transmittance of each filter of the image capturing device.

FIG. 3 illustrates spectral transmittance of the filter 26. The filter 26 is composed of six spectral filters or filter areas (collectively referred to as "filters"), which are respectively indicated by channels CH1, CH2, CH3, CH4, CH5, and CH6. With these filters, a spectrum in a visible range of 400 nm to 700 nm can be estimated. The transmittance distribution of each filter, or each channel "CH", can be expressed using the Gaussian function as indicated by Equation 1 of FIG. 10. In Equation 1, "a" denotes the wavelength value, "b" denotes transmittance of the peak wavelength value of the filter, and "c" denotes the full width at half maximum (FWHM). FIG. 9 shows the parameters "a", "b", and "c" for each of channels CH1 to CH6, according to this example.

While the image capturing system 10 is configured to estimate a spectrum in the visible range, as illustrated in FIG. 3, at least two filters of the filter 26 are designed to have transmittance that is greater than 0%, throughout the 400-700 nm range.

Figure 4:
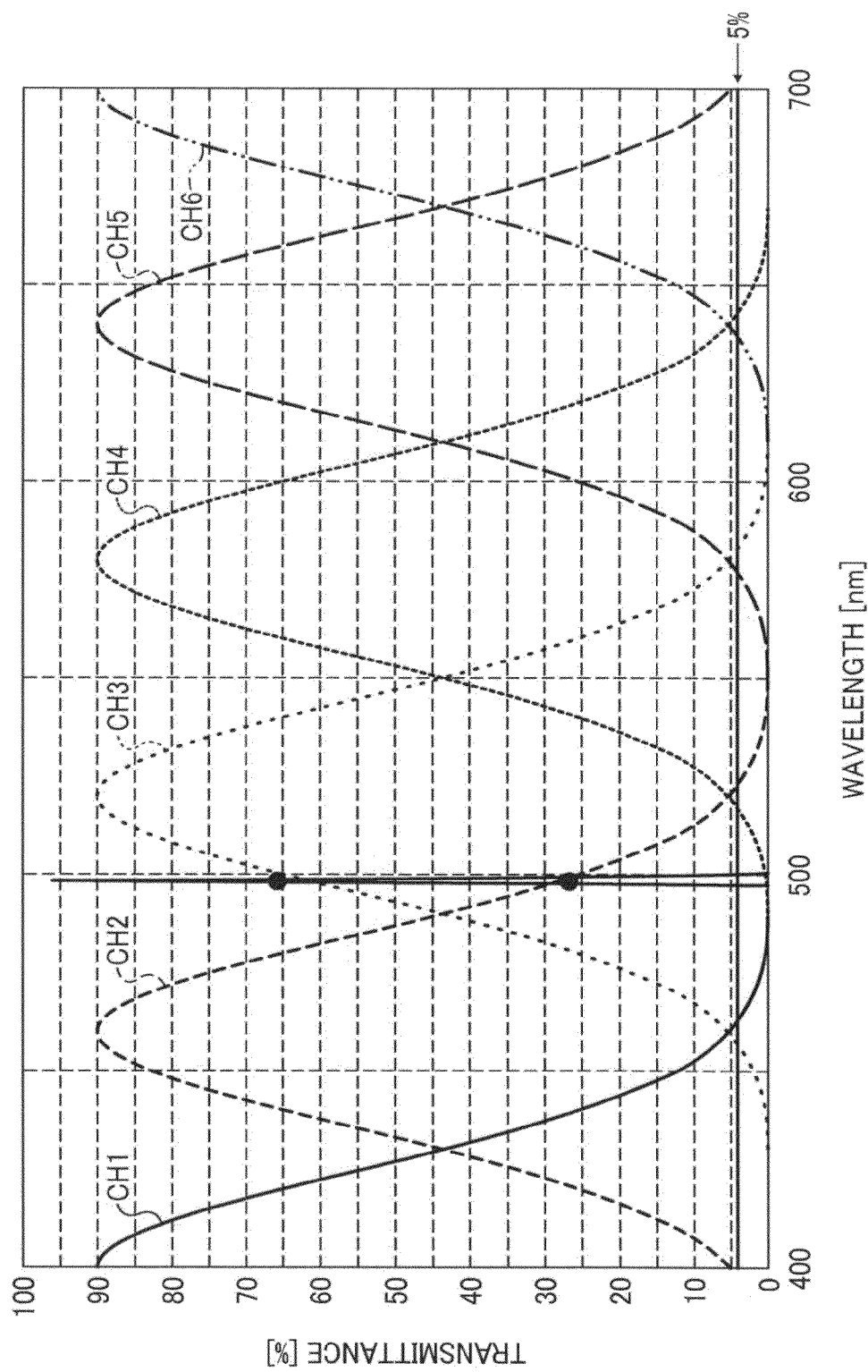
FIG. 4 is an illustration for explaining operation of estimating a spectrum using the spectrum calculator of FIG. 2.

In case of determining whether there is output from each channel or there is just noise, it is preferable to design at least two filters of the filter 26 to have transmittance that is equal to or greater than 5%, throughout the 400-700 nm range, as illustrated in FIG. 4. Using the ratio between the spectral images that are respectively obtained from the lights passing through two or more filters, a line spectrum of the object can be estimated. More specifically, the ratio in output intensity of spectral image is obtained for at least two channels.

Referring to FIG. 4, example operation of estimating a spectrum of laser light at 500 nm is described. Assuming that the laser light at 500 nm is input to the image capturing system 10, the output intensities of the channels CH1 to CH6 (filters) are: CH1:CH2:CH3:CH4:CH5:CH6=0:26:66:1:0:0, after normalizing the spectral sensitivity of the optical system and the sensor of the image capturing system 10.

The ratio in output intensity between CH2 and CH3 corresponds to the ratio in transmittance between CH2 and CH3 at the crossing points, indicated by the black circle in FIG. 4.

The waveform of the filter is described using the Equation 1. Since the central wavelength would be equal to the output intensity of CH2 and the output intensity of CH3, the intensity of a line spectrum can be calculated.

Conventionally, even when the output intensities of a continuous spectrum for CH2 and CH3 are known, is has been difficult to estimate the peak value and the intensity of a line spectrum from the output intensities of CH2 and CH3 with improved accuracy. For example, the Weiner estimation method is not applicable to estimating a line spectrum of an object, such as an illumination spectrum of laser. There is a need for estimating a line spectrum of an object, which may be used for color inspection.

In view of this, at least two filters or filter areas of the filter 26 are designed to have transmittance that is equal to or greater than 5%. The value of 5% is previously determined based on empirical data as a threshold that can effectively eliminate noise, such that the level of output that cannot be determined through which filter or filter area the light passes is eliminated as noise. Further, the threshold value of transmittance is not limited to 5%, and the other value may be set as long as the threshold value can effectively eliminate noise to improve estimation of a line spectrum.

In case there is only a single line of spectrum, while output intensity can be obtained for CH2 and CH3, the output intensity for all other channels may not be obtained based on assumption that the output intensity of CH4 would be determined to be noise. More specifically, when the ratio in output intensity between the maximum value and the minimum value is equal to or greater than 90:5, the minimum value would be treated as noise.

In the image capturing system 10, the spectrum calculator 16 switches the operation mode between a continuous spectrum mode in which a continuous spectrum is estimated, and a line spectrum mode in which a line spectrum is estimated. Of three or more spectral images output from the FPGA 14, when there is at least one channel that does not have output, the spectrum calculator 16 assumes that it is a line spectrum, and starts estimating the line spectrum in the line spectrum mode.

Figure 5:
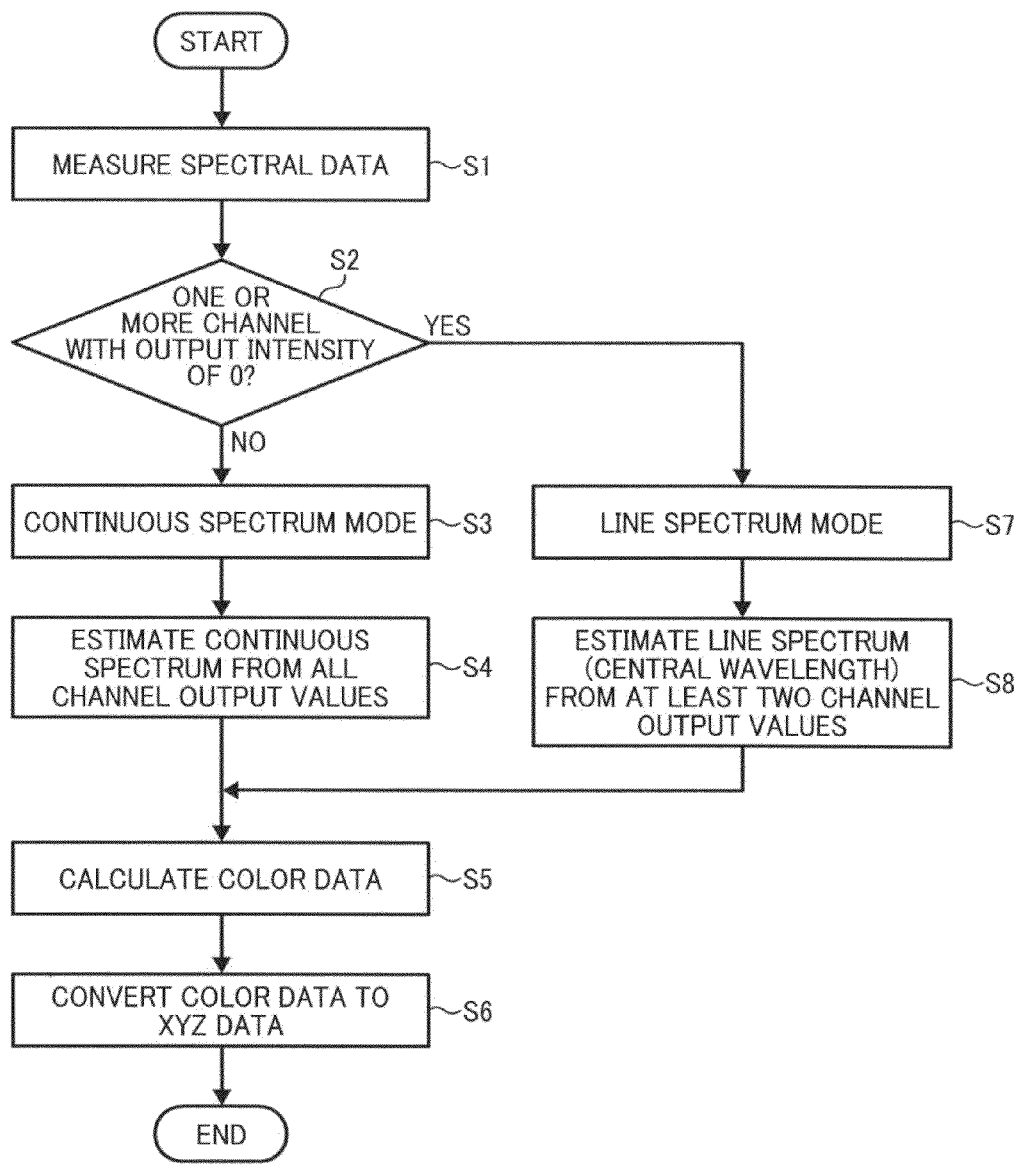
FIG. 5 is a flowchart illustrating operation of estimating a continuous spectrum or a line spectrum of the object, performed by the spectrum calculator of FIG. 2, according to an example embodiment of the present invention.

FIG. 5 is a flowchart illustrating operation of estimating a spectrum of an object, performed by the spectrum calculator 16, according to an example embodiment of the present invention.

At S1, the spectrum calculator 16 starts measuring spectral data, which is output from the FPGA 14 of the image capturing device 12.

At S2, the spectrum calculator 16 determines whether there is at least one channel, i.e., the filter or the filter area of the filter 26, having the output intensity of "0". When it is determined that there is no channel having "0" output intensity ("NO" at S2), it is assumed that the spectral data is not a line spectrum, and the operation proceeds to S3. At S3, the spectrum calculator 16 sets an operation mode to a continuous spectrum mode to start estimating a spectrum in the continuous spectrum mode.

At S4, the spectrum calculator 16 estimates a continuous spectrum, from output values of all channels "CH", in the continuous spectrum mode.

At S5, the spectrum calculator 16 calculates color data.

At S6, the spectrum calculator 16 converts the color data to XYZ tristimulus values.

Further, in this example, the spectrum calculator 16 may convert the calculated XYZ values to RGB values for display through a display capable of displaying an image in RGB color space.

At S2, when the spectrum calculator 16 determines that there is at least one channel, i.e., the filter or the filter area, having the output intensity of "0" ("YES" at S2), it is assumed that the spectral data is a line spectrum, and the operation proceeds to S7. At S7, the spectrum calculator 16 sets an operation mode to a line spectrum mode to start estimating spectral data in the line spectrum mode.

At S8, the spectrum calculator 16 estimates a line spectrum, from output values of at least two channels "CH", in the line spectrum mode. The line spectrum corresponds to the central wavelength value.

In the above-described operation, the spectrum calculator 16 may automatically switch the operation mode to the line spectrum mode, when the channels other than two channels each have the output intensity of "0". This is based on assumption that there is an object that may absorb the light at a specific portion of wavelength in the nature.

More specifically, the image capturing system 10 includes the filter 26 having the filters or the filter areas, which respectively have "m" types of spectral characteristics that are different from one another, with "m" being equal to or greater 3. The transmittance of the filters are designed, such that at least "n" filters have transmittance of 5% or more throughout the wavelength values in the wavelength range subject for estimation, with "n" being equal to or greater than 2. In case there is no output of spectral image for "m-n" filters or filter areas, the spectrum calculator 16 determines that spectral data is a line spectrum, and switches the operation mode to the line spectrum mode to estimate the line spectrum of the object.

With the above-described switching function, the spectrum calculator 16 is able to estimate a line spectrum of the object, even when there is a need for estimating a laser projection image obtained through the image capturing device having a scanning device such as micro electro mechanical systems (MEMS) or polygon motor, which is provided with a laser projection device.

The image capturing system 10 of FIG. 2 may be implemented in various ways. In one example, the image capturing device 12 and the spectrum calculator 16 may be incorporated into one apparatus, such as an image capturing apparatus. In another example, the image capturing device 12 and the spectrum calculator 16 may be implemented by two or more apparatuses, one being the image capturing device 12 and the other being an information processing apparatus having the spectrum estimation program installed thereon.

In the above-described example, the line spectrum is estimated based on the ratio in output intensity between or among more than two filters or filter areas, when at least two or more filter or filter areas have transmittance that exceeds 0%. Alternatively, in case only one channel (such as CH2) exceeds 0% of transmittance, and the other channels have 0% of transmittance, the central wavelength of that one channel (such as CH2) may be used as the peak value of the line spectrum.

Figure 6:
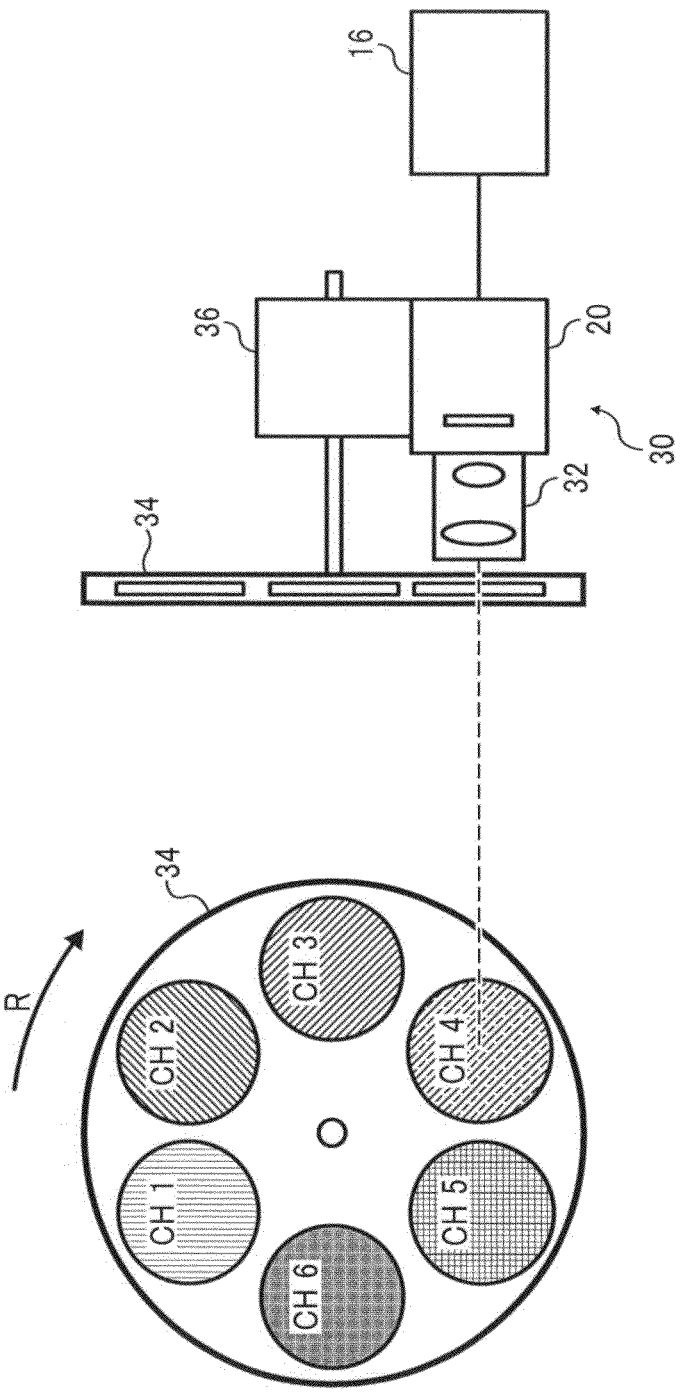
FIG. 6 is a schematic block diagram illustrating a structure of an image capturing system provided with an image capturing device and a spectrum calculator, according to an example embodiment of the present invention.

Moreover, the spectrum calculator 16 of FIG. 2 may be used to estimate a spectrum of the object, based on spectral data obtained through an image capturing device other than the image capturing device 12 of FIG. 2. FIG. 6 illustrates an image capturing system according to an example embodiment of the present invention. The image capturing system of FIG. 6 includes an image capturing device 30, and the spectrum calculator 16. The image capturing device 30 includes a lens unit 32, a camera 20, a filter 34 arranged in front of the lens unit 32, and a motor 36 that rotates the filter 34.

The filter 34 includes a plurality of filter areas CH1 to CH6, which are arranged on a disc-like plate. As the filter 34 rotates in a predetermined direction indicated by "R" by the motor 36, the image capturing device 30 captures a plurality of types of spectral image in time series.

In the image capturing device 12 of FIG. 2, lights pass through the plurality of filters or filter areas of the filter 26 at substantially the same time to obtain a two-dimensional, linear spectral image, in real time.

In the image capturing device 30 of FIG. 6, with rotation of the filter 34, a plurality of types of spectral image of an object are obtained in time series. As described above, the spectral image may indicate spectral information such as reflection or illumination spectral information. Further, in this example, the plurality of filter areas of the filter 34 have spectral characteristics, which are substantially the same to the above-described filters of the image capturing device 12.

Further, any one of the image capturing systems described above referring to FIGS. 2 and 6 may be used in various systems. For example, the line spectrum of the object may be used to inspect colors of the object.

Figure 7:
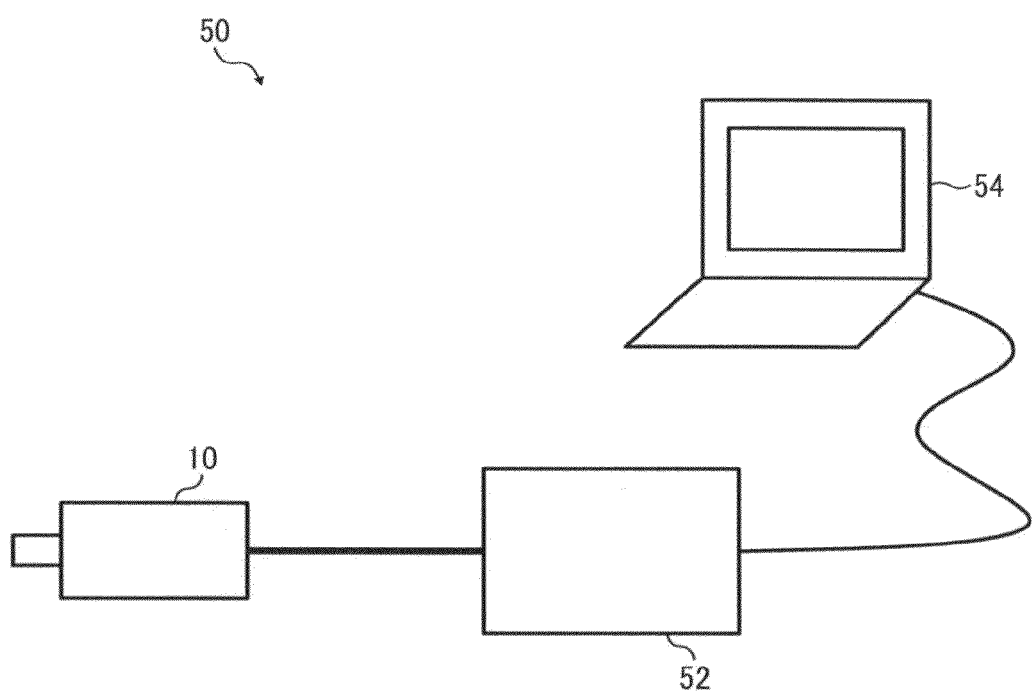
FIG. 7 is a configuration of a color inspection system provided with an image capturing device and a spectrum calculator, according to an example embodiment of the present invention.

FIG. 7 illustrates a color inspection system 50 according to an example embodiment of the present invention. The color inspection system 50 includes the image capturing system 10 of FIG. 2, a processing circuit 52, and a personal computer (PC) 54.

The processing circuit 52 may be implemented by a processor that performs color inspection according to color inspection program, or a specialized programmed circuit. The PC 54 is a general-purpose computer, which includes a processor such as a CPU, and a memory such as a ROM and a RAM.

Figure 8:
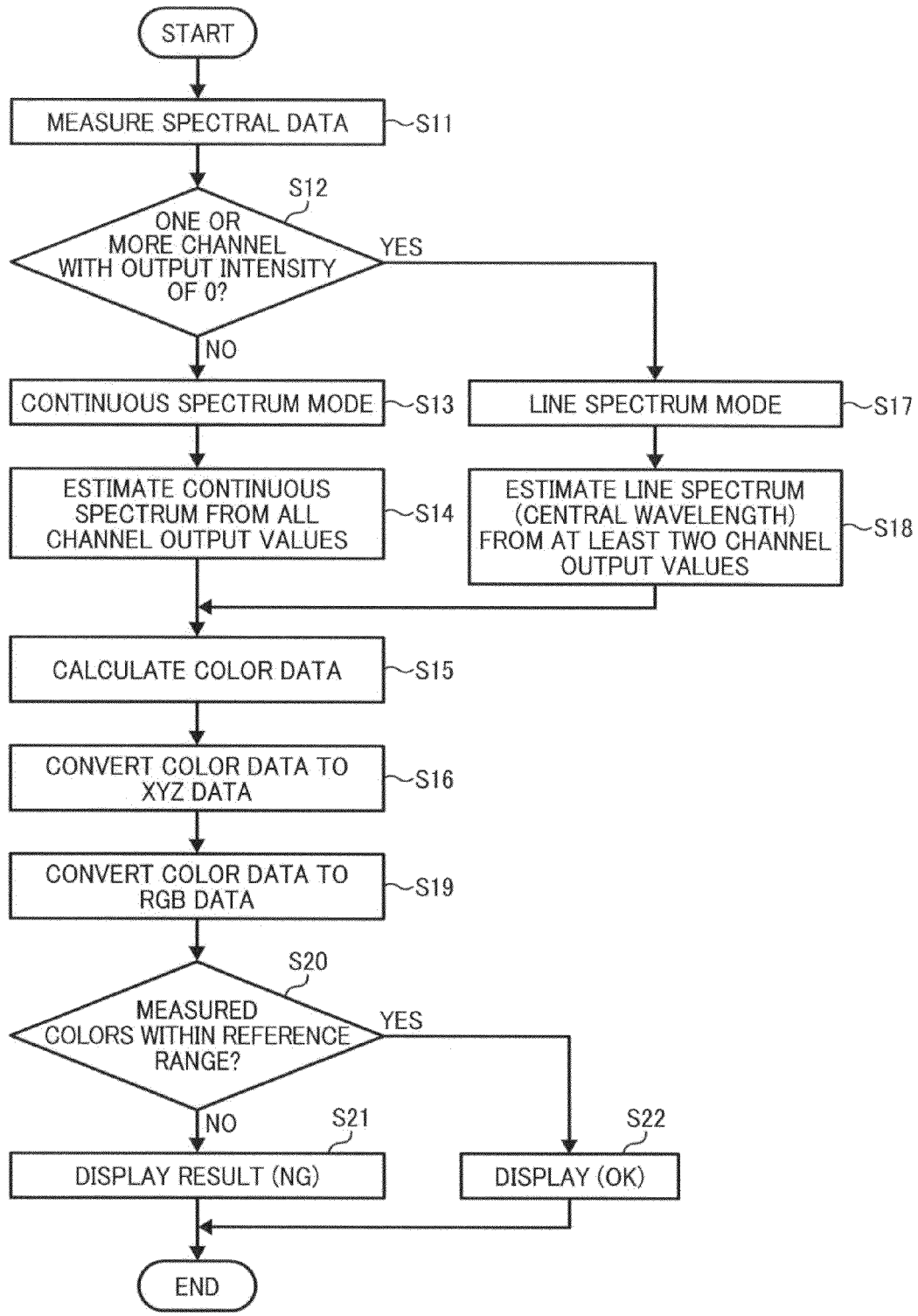
FIG. 8 is a flowchart illustrating operation of inspecting colors of an object, performed by the color inspection system of FIG. 7, according to an example embodiment of the present invention.

FIG. 8 is a flowchart illustrating operation of estimating a spectrum of an object and inspecting colors of the object, performed by the color inspection system 50, according to an example embodiment of the present invention.

S11 to S18 are performed by the spectrum calculator 16, in a substantially similar manner as described above referring to FIG. 5. However, in alternative to cause the spectrum calculator 16 of the image capturing system 10 to obtain the XYZ tristimulus values, the processing circuit 52 may obtain the spectral data from the image capturing system 10, and convert the spectral data to the XYZ values.

At S19, the processing circuit 52 may further convert the calculated XYZ values to RGB values for display through a display capable of displaying an image in RGB color space.

For example, XYZ values can be calculated from spectral data using Equation 3 of FIG. 10. $\phi(\lambda)$ is a spectrum function, specifically, a CIE color matching function. The constant "k" is expressed using Equation 4 of FIG. 10. The integral of integration corresponds to the visible wavelength range. The color space does not have to be XYZ color space, but RGB color space. The color space can be converted from XYZ to RGB, using Equation 5.

Referring back to FIG. 8, at S20, the processing circuit 52 of the color inspection system 50 determines whether the measured colors are within a range of reference colors, using the color data such as XYZ data or RGB data. When it is determined that the measured colors are within the reference range ("YES" at S20), the operation proceeds to S22 to display the result "OK" on a display of the PC 54. When it is determined that the measured colors are not within the reference range ("NO" at S20), the operation proceeds to S21 to display the result "NG" on the display of the PC 54.

In the above-described example, the color data may be output in any desired color space. For example, when inspecting color uniformity of a spectral image on the display of the PC 54, the color data may be converted to RGB.

For this reasons, at least one of S16 and S19 may be performed, or conversion to any other different color space may be performed, depending on an output device that outputs the result.

The color inspection system 50 of FIG. 7 may be implemented in various ways. For example, the functions of the processing circuit 52 may be combined together with the functions of the spectrum calculator 16. In such case, the image capturing system 10 and the processing circuit 52 are incorporated into one apparatus, such as an image capturing apparatus, which is capable of estimating spectral data of the object and inspecting color of the object based on the obtained spectral data. In such case, the inspection result may be transmitted to the PC 54 for display.

Alternatively, the processing circuit 52 may be incorporated into the PC 54. In such case, the PC 54 having the processing circuit 52 therein obtains spectral data from the image capturing system 10, and performs color inspection based on the spectral data obtained from the image capturing system 10.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An image capturing apparatus, comprising:
   an optical system configured to focus lights from an object to generate optical information;
   a filtering device including filters or filter areas that respectively have spectral characteristics different from one another, wherein:
      the filtering device includes at least three filters or filter areas, and
      at least two filters or filter areas of the filtering device are configured to have transmittance greater than a predetermined value throughout a wavelength range subject for estimation;
   a sensor configured to form a plurality of types of spectral image based on the optical information; and
   a processor configured to estimate a line spectrum of the object using spectral images of the at least two filters or filter areas having transmittance greater than the predetermined value, wherein
   when the processor determines that at least one spectral image of at least three spectral images corresponding to the at least three filters or filter areas of the filtering device is not output, the processor switches to a line spectrum mode to estimate the line spectrum of the object.

2. The image capturing apparatus of claim 1, wherein the processor estimates the line spectrum of the object using a ratio in output intensity between or among the spectral images of the at least two filters or filter areas having transmittance greater than the predetermined value.

3. The image capturing apparatus of claim 2, wherein the predetermined value is 0%.

4. The image capturing apparatus of claim 2, wherein the predetermined value is 5%.

5. The image capturing apparatus of claim 1, wherein the optical system includes:
   a first optical system, wherein the filtering device is provided near a diaphragm position of the first optical system; and
   a second optical system provided between the first optical system and the sensor and configured to have a plurality of lenses being arranged in a substantially parallel in a direction of a two-dimensional surface of the sensor.

6. The image capturing apparatus of claim 1, wherein the processor estimates a reflection spectral image or an illumination spectral image of the object.

7. A color inspection system, comprising:
   the image capturing apparatus of claim 1; and
   an information processing apparatus configured to obtain spectral data indicating the estimated line spectrum of the object from the image capturing apparatus, and to inspect color of the object based on the spectral data.

8. An image capturing system, comprising:
   an image capturing apparatus including:
   an optical system configured to focus lights from an object to generate optical information;
   a filtering device including filters or filter areas that respectively have spectral characteristics different from one another, wherein:
      the filtering device includes at least three filters or filter areas, and
      at least two filters or filter areas of the filtering device are configured to have transmittance greater than a predetermined value throughout a wavelength range subject for estimation; and
   a sensor configured to form a plurality of types of spectral image based on the optical information; and
   an information processing apparatus including a processor, the processor being configured to estimate a line spectrum of the object using spectral images of the at least two filters or filter areas having transmittance greater than the predetermined value, wherein when the processor determines that at least one spectral image of at least three spectral images corresponding to the at least three filters or filter areas of the filtering device is not output, the processor switches to a line spectrum mode to estimate the line spectrum of the object.

9. The image capturing system of claim 8, wherein the processor of the information processing apparatus estimates the line spectrum of the object using a ratio in output intensity between or among the spectral images of the at least two filters or filter areas having transmittance greater than the predetermined value.

10. A method of estimating a spectrum of an object, comprising:

obtaining, by a processor, a plurality of types of spectral image, the plurality of types of spectral image being generated by passing lights through filtering device having m items of filters or filter areas that respectively have spectral characteristics different from one another, wherein at least n items of filters or filter areas of the filtering device are configured to have transmittance greater than a predetermine value throughout a wavelength range subject for estimation;

determining, by the processor, whether there is no output of spectral image for (m-n) items of spectral images;

switching, by the processor, to a line spectrum mode when the determining determines that there is no output of spectral image for (m-n) items of spectral images; and estimating, by the processor, a line spectrum of the object using spectral images of the at least n items of filters or filter areas having transmittance greater than the predetermined value;

areas have transmittance greater than the predetermined value at any wavelength throughout the wavelength range subject for the estimation.

11. The method of claim 10, further comprising:

inspecting color of the object based on spectral data, the spectral data indicating the estimated line spectrum of the object.

12. The image capturing apparatus of claim 1, wherein the at least two filters or filter areas have transmittance greater than the predetermined value at any wavelength throughout the wavelength range subject for the estimation.

* * * * *